United States Patent
Akita et al.

(10) Patent No.: US 7,339,702 B2
(45) Date of Patent: Mar. 4, 2008

(54) PICTURE READING DEVICE FOR DISCRIMINATING THE TYPE OF RECORDING MEDIUM AND APPARATUS THEREOF

(75) Inventors: Masanori Akita, Shizuoka (JP); Shoji Maruyama, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 960 days.

(21) Appl. No.: 10/420,711

(22) Filed: Apr. 23, 2003

(65) Prior Publication Data
US 2003/0202214 A1 Oct. 30, 2003

(30) Foreign Application Priority Data
Apr. 25, 2002 (JP) ............................. 2002-124430

(51) Int. Cl.
*H04N 1/23* (2006.01)
*G06T 7/40* (2006.01)
(52) U.S. Cl. .................... 358/1.9; 358/406; 382/108
(58) Field of Classification Search ............... 358/1.9, 358/1.12, 406, 504, 296; 382/108; 356/600, 356/237.2; 347/19, 101, 105, 106, 153, 221, 347/262, 264; 399/16, 23, 381, 388–391
See application file for complete search history.

(56) References Cited

U.S. PATENT DOCUMENTS

| | | | |
|---|---|---|---|
| 5,596,353 A * | 1/1997 | Takada et al. ................. | 347/19 |
| 5,925,889 A | 7/1999 | Guillory et al. ....... | 250/559.16 |
| 6,291,829 B1 | 9/2001 | Allen et al. ............. | 250/559.07 |
| 6,452,632 B1 * | 9/2002 | Umeda et al. ............... | 348/294 |
| 6,512,218 B1 * | 1/2003 | Canini et al. ............. | 250/208.1 |
| 6,520,614 B2 * | 2/2003 | Kaneko ........................ | 347/19 |
| 6,801,727 B2 * | 10/2004 | Maruyama et al. ........... | 399/45 |
| 6,984,034 B2 * | 1/2006 | Tsujimoto ................... | 347/105 |
| 7,095,968 B2 * | 8/2006 | Akita et al. ................... | 399/45 |
| 2001/0026293 A1 * | 10/2001 | Kaneko ........................ | 347/19 |

FOREIGN PATENT DOCUMENTS

| JP | 11216938 | 8/1999 |
|---|---|---|
| JP | 11271037 | 10/1999 |

OTHER PUBLICATIONS

English abstract & translation of JP 11271037 A published patent application.*

* cited by examiner

*Primary Examiner*—Scott A. Rogers
(74) *Attorney, Agent, or Firm*—Fitzpatrick, Cella, Harper & Scinto

(57) ABSTRACT

Provided is a picture reading device that is suited for discriminating the type/surface condition of a recording medium while requiring only a small circuit scale and less memory, and an image forming apparatus that uses the picture reading device. In a CMOS area sensor chip having a plurality of photoelectric conversion elements, there is provided a calculating unit for calculating the maximum value, the minimum value, and an average value of digital information related to a photoelectric conversion element in a specific area among the plurality of photoelectric conversion elements. Information calculated by the calculating unit is output in addition to digital information related to the plurality of photoelectric conversion elements.

9 Claims, 12 Drawing Sheets

TRANSFER TIMING FOR PIXEL (8 bit)

TRANSFER TIMING FOR 1 LINE (64 PIXELS)

TRANSFER TIMING FOR 64 LINES

RECORDING MATERIAL A
RECORDING MATERIAL B
RECORDING MATERIAL C

PICTURE READING DEVICE FOR DISCRIMINATING THE TYPE OF RECORDING MEDIUM AND APPARATUS THEREOF

BACKGROUND OF THE INVENTION

1. Field of the Invention

The present invention relates to a picture reading device that is suited to be employed in an image forming apparatus, such as a laser printer or an ink jet printer, and in particular to discrimination of the type/surface condition of a recording medium (sheet) or the like.

2. Related Background Art

Conventionally, a plurality of print modes have been provided for an image forming apparatus such as a laser beam printer or an ink jet printer, thereby making it possible to obtain an optimum image regardless of which type of printer sheet is used. However, setting from among the print modes is performed by a user himself/herself at the time of printing, so that it is required for the user to have knowledge for discriminating among types of paper and to perform a cumbersome operation of setting the type of a currently used paper by himself/herself. This leads to a problem that it becomes impossible to obtain an optimum image if the paper type is erroneously set.

In recent years, however, there has been devised an image forming apparatus that detects a difference in quantity between regular reflection light and diffused reflection light reflected by the surface of paper, automatically discriminates the type of the sheet based on a result of the detection, and performs image forming control according to a result of the discrimination, thereby making it possible to obtain an optimum image. FIG. 17 is a cross-sectional view of a printer gloss meter according to the invention disclosed in Japanese Patent Application Laid-Open No. 11-216938. A gloss detector 200 includes a block 210 that is attached to a printed board 220 in a usual manner. A light source tube 212 on an axis 213 and a reflection tube 214 on an axis 215 are formed in the block 210. A light source 216 is positioned inside of the light source tube 212, while a photosensor 222 is positioned inside of the reflection tube 214. With this construction, the photosensor 222 mainly reacts to spectral reflection light, thereby discriminating between low gloss paper and high gloss paper.

Also, there has been invented a method with which a picture of the surface of paper is captured by a CCD area sensor and there is obtained a fractal dimension, thereby obtaining the roughness of paper. FIG. 18 is a process flow diagram showing the basic operation of a smoothness detector according to the invention disclosed in Japanese Patent Application Laid-Open No. 11-271037. First, area irradiation of the surface of a recording medium with light is performed in step 2-1 (this step is denoted as "S2-1" in the drawing, the same applies to the succeeding steps). Following this, a shadow image formed by reflection light resulting from the area-irradiation is read as a plane image by image detecting means including image reading means, and information regarding the tone thereof is detected as multivalued image data (step 2-2). That is, when light is irradiated, reflection light is given shadows due to projections and depressions in the recording medium, with each depressed portion becoming dark and each projected portion becoming bright. Then, this shadow image is detected with a CCD that serves as image reading means. The light and shade information that is multivalued data of the detected image is subjected to image processing by information processing means, thereby measuring and calculating the surface roughness of the recording medium (step 2-3). Following this, a parameter value of image forming is determined and controlled by image forming control means according to the measured and calculated surface roughness (step 2-4). That is, in this conventional example, it is possible to estimate the surface roughness of a recording medium by reading light and shade information from the CCD.

When there is used an image pickup sensor such as an area sensor or a line sensor, however, it is required to perform an enormous amount of calculation, which leads to an increase in circuit scale, elongation of a time taken to perform calculation, and an increase in cost. Also, when there is performed complicated calculation, a large volume of memory is required, which leads to a problem that the apparatus size and cost are increased.

SUMMARY OF THE INVENTION

The present invention has been made under such circumstances, and an object thereof is to provide a picture reading device that is suited for discriminating the type/surface condition of a recording medium while requiring only a small circuit scale and less memory, and an image forming apparatus using the picture reading device.

Still another object of the present invention is to provide a picture reading device for discriminating a type of a recording medium, the device including: an irradiating element that irradiates a surface of the recording medium; and a picture reading part for receiving reflection light from the recording medium, in which the picture reading part is constructed as a monolithic semiconductor chip, the monolithic semiconductor chip including: a reading element for reading a picture of a surface of a reading target and photoelectrically converting the picture; an A/D conversion circuit for converting information of the picture read by the reading element into a digital value; a calculation circuit that calculates a parameter concerning a smoothness characteristic for discriminating the type of the recording medium based on two-dimensional picture information having a plurality of digital values converted by the A/D conversion unit; and an output part for outputting a result of the calculation by the calculation circuit. The reading element, the A/D conversion circuit, the calculation circuit and the output port are mounted in one chip. Also, the calculation circuit calculates a maximum value, a minimum value and an average value of digital values per a line in a predetermined direction of the two-dimensional picture information, and the output part outputs the maximum value, the minimum value and the average value per line in the predetermined direction of the two-dimensional picture information.

Yet still another object of the present invention is to provide an image forming apparatus including: an image forming part for forming an image on a recording medium; a picture reading part for reading a picture of a surface of the recording medium; a discriminating part for discriminating a type of the recording medium based on a result of the reading by the picture reading part; and a setting part for setting image forming conditions for the image forming part based on a result of the discrimination by the discriminating part, in which the picture reading part is constructed as a monolithic semiconductor chip, the monolithic semiconductor chip including: a reading element for reading a picture of a surface of a reading target and photoelectrically converting the picture; an A/D conversion circuit for converting information of the picture read by the reading element into a digital value; a calculation circuit that calculates a parameter concerning a smoothness characteristic for discriminating the type of the recording medium based on two-dimensional picture information having a plurality of digital values converted by the A/D conversion unit; and an output unit for outputting a result of the calculation by the calculation circuit. The reading element, the A/D conversion circuit, the calculation circuit and the output port are mounted in one chip. Also, the calculation circuit calculates a maximum value, a minimum value and an average value of digital values per a line in a predetermined direction of the two-dimensional picture information, and the output part outputs the maximum value, the minimum value and the average value per line in the predetermined direction of the two-dimensional picture information.

Other objects, construction and effects of the present invention will become apparent from the following detailed description of the invention taken in conjunction with the attached drawings.

DESCRIPTION OF THE PREFERRED EMBODIMENTS

A picture reading device and an image forming apparatus according to the present invention will now be described in detail based on embodiments thereof. Note that, in addition to the discrimination of the type/surface condition of a recording medium, the present invention is also applicable to discrimination of the type/surface condition of an arbitrary target other than the recording medium.

First Embodiment

Figure 1:
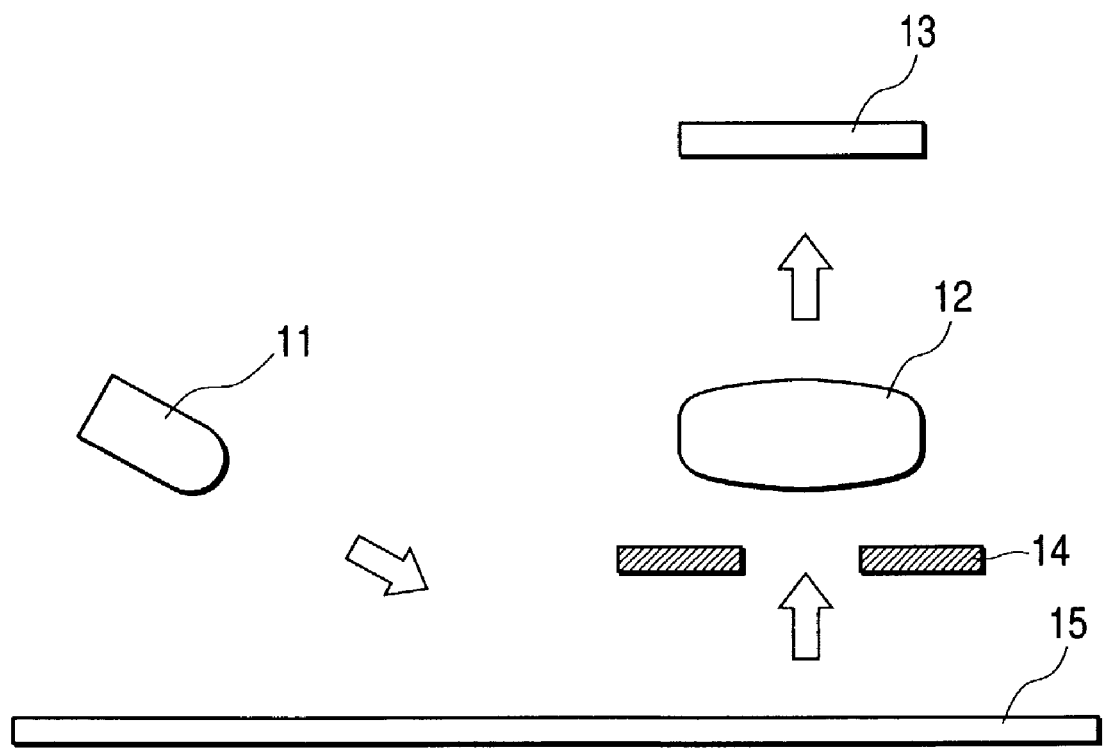
FIG. 1 shows the schematic construction of a first embodiment of the invention.

A picture reading device of a first embodiment of the invention will be described below with reference to FIGS. 1 to 8. FIG. 1 shows the schematic construction of the picture reading device. This picture reading device is composed of a light source 11, a lens 12, a CMOS area sensor chip 13, and a diaphragm 14, with these construction elements being arranged on the same substrate that is not shown in the drawing. Note that the CMOS area sensor chip 13 may be a line sensor. Also, the diaphragm 14 may be eliminated.

The light source 11 irradiates light toward a recording medium (corresponding to a reading target) 15, and a surface image of the recording medium 15 obtained by this light irradiation is imaged on the CMOS area sensor 13 through the Lens 12 and the diaphragm 14.

Figure 2:
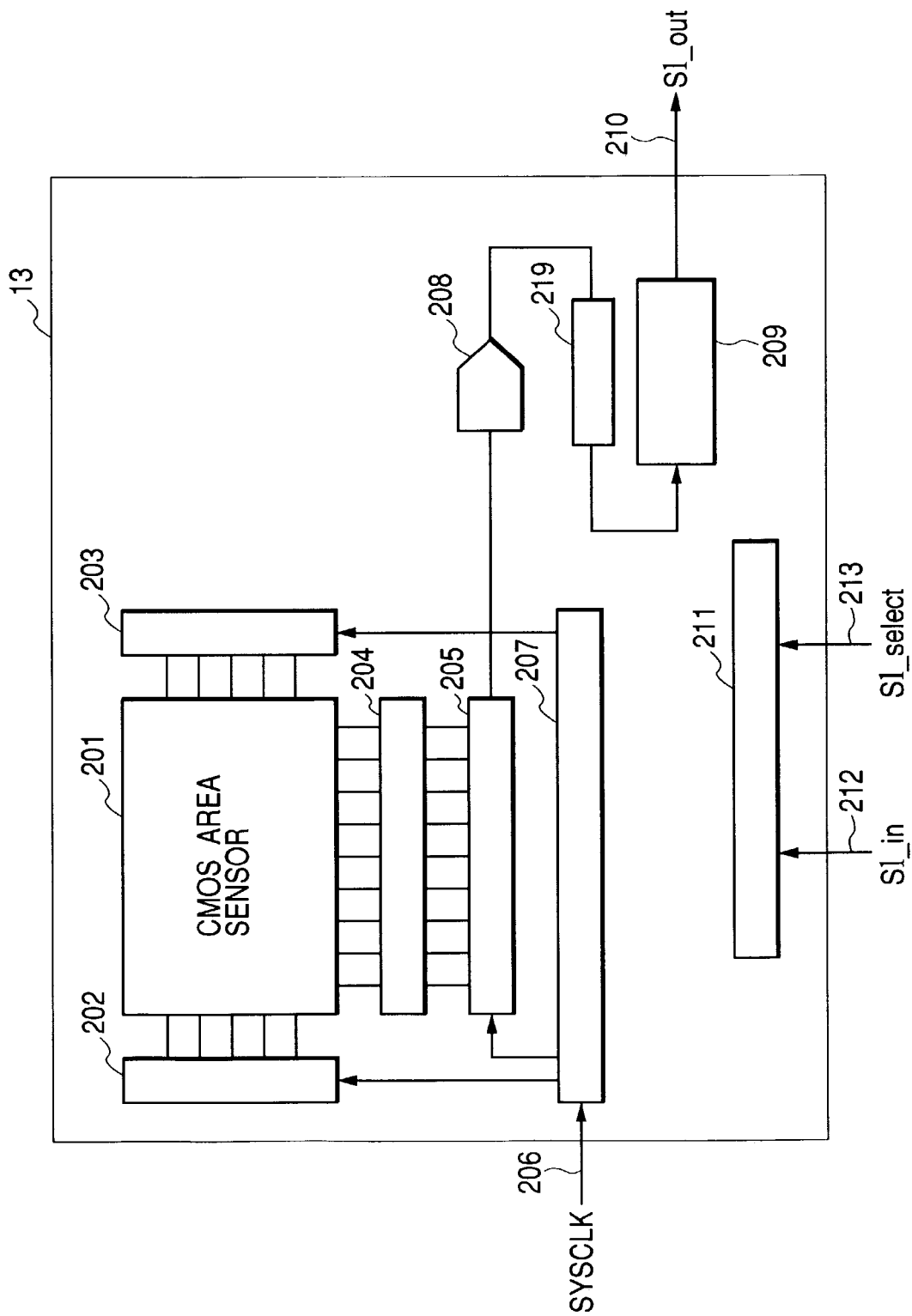
FIG. 2 is a block diagram showing the construction of a CMOS area sensor chip.

Next, the CMOS area sensor chip 13 will be described in detail with reference to FIG. 2. This CMOS area sensor chip 13 is constructed as a monolithic semiconductor chip through a C-MOS process.

In this drawing, reference numeral 201 denotes a CMOS sensor part in which, for instance, sensors for 64×64 pixels are arranged in an area manner. Also, the CMOS sensor part receives reflection light from the recording medium and photoelectrically converts the received light. Reference numerals 202 and 203 each represent a vertical direction shift register, numeral 204 an output buffer, numeral 205 a horizontal direction shift register, numeral 206 a system clock, and numeral 207 a timing generator. Also, reference numeral 208 indicates an A/D converter, numeral 219 a calculating part that calculates various parameters concerning smoothness characteristics for discriminating the type of the recording medium, numeral 209 an output interface circuit, and numeral 210 an output terminal and a signal line for outputting a result of the calculation by the calculating part, picture information before the calculation result, and the like.

Next, there will be described an operation in this embodiment. When an Sl_select signal 213 is set as active, the CMOS sensor part 201 starts accumulation of electric charges based on the received light. Next, when the system clock 206 is given, the vertical direction shift registers 202 and 203 sequentially select a pixel column to be read and set read data in the output buffer 204 according to timings generated by the timing generator 207.

The data set in the output buffer 204 is transferred to the A/D converter 208 by the horizontal direction shift register 205. The data transferred to the A/D converter 208 by the horizontal direction shift register 205 is converted into pixel data through digital conversion by the A/D converter 208. The pixel data obtained as a result of the digital conversion by the A/D converter 208 is transferred to the calculating part 219. In this calculating part 219, there are calculated the maximum value, the minimum value, and an average value for each scanning line. Results of this calculation and image data are transferred to the output interface circuit 209. At this time, only the calculation results may be transferred. The output interface circuit 209 outputs the calculation results as an Sl_out signal 210 at a predetermined timing while the Sl_select signal 213 is set as active.

On the other hand, it is possible to variably control an A/D conversion gain through a control circuit 211 using an SI_in signal 212. When it is impossible to obtain a correct contrast of a picked-up image, for instance, it is possible for the CPU to perform image pickup (taking a picture) with the best contrast at all times by changing the gain.

Also, it is possible to perform switching between a mode in which the results of the calculation by the calculating part are added to data of the picked-up image and are output along with the image, and a mode in which only the calculation results are output.

Next, there will be described a data transfer scheme for transferring data from the CMOS area sensor chip 13 to, for instance, a control part of the image forming apparatus that performs discrimination of the type/surface condition (or the surface roughness) of the recording medium.

Figure 3:
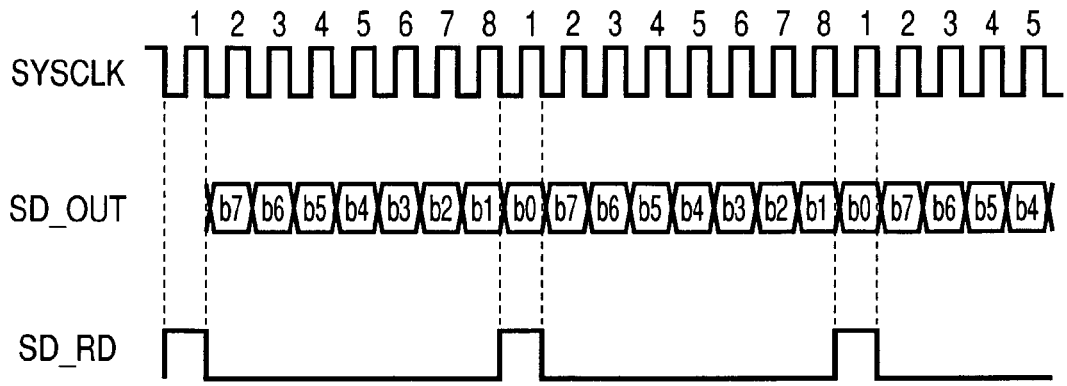
FIG. 3 shows a transfer timing for one pixel (eight bits)

FIG. 3 shows a transfer timing for one pixel. Each light-receiving device output is output at a falling timing of SYSCLK. Concurrently with the falling of an SD_RD signal, 8-bit data for each pixel is transmitted in a serial manner. At this time, it is not required that the data is output in the serial manner and it is also possible to perform this outputting in a parallel manner.

Figure 4:
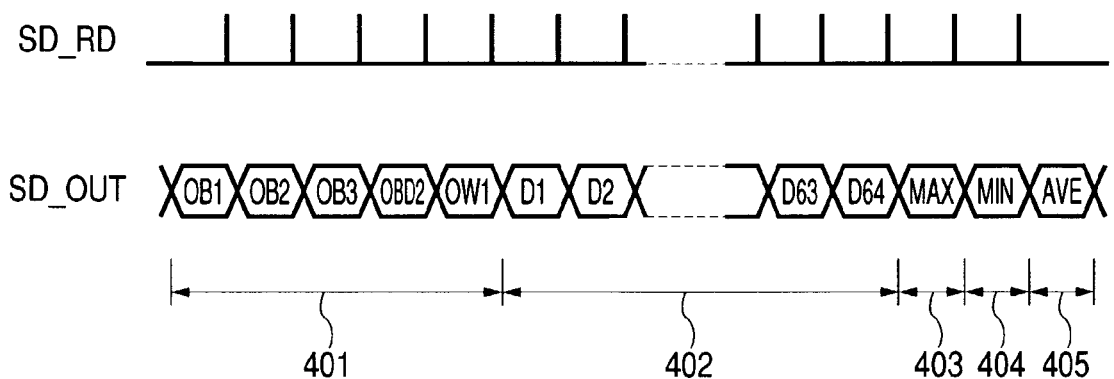
FIG. 4 shows a transfer timing for one line (64 pixels)

FIG. 4 shows a transfer timing for one line (64 pixels). During outputting for each line, there is first transmitted data in ineffective pixels 401. Following this, data in 64 effective pixels 402 (corresponding to one line) is output and, when outputting for the 64th pixel is finished, there are next output the maximum value 403, the minimum value 404, and an average value 405.

Figure 5:
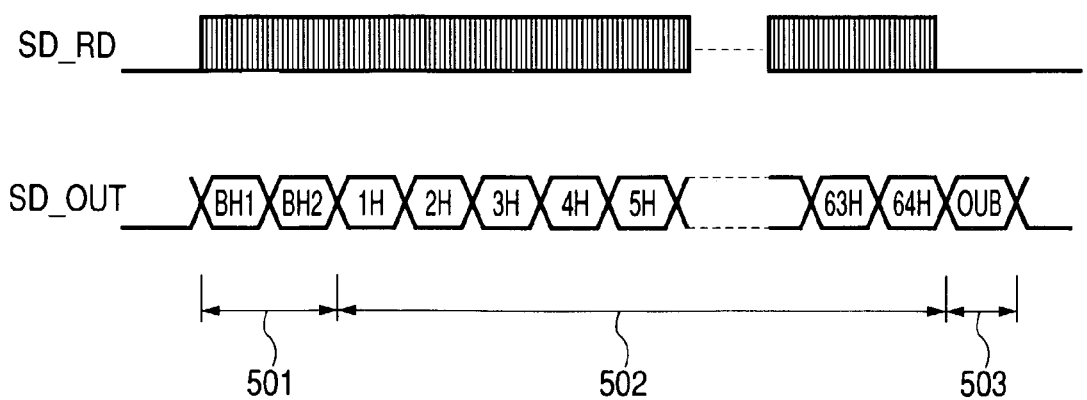
FIG. 5 shows a transfer timing for one page (64 lines)

FIG. 5 shows a transfer timing for one page (64 lines). After data on an ineffective pixel line 501 is output, data on 64 effective pixel lines 502 is output.

During this operation, if image data is not sent and only calculation results are sent, it becomes possible to increase a transfer rate. Here, through the control circuit 211, it is possible to perform switching of whether the image data is to be sent.

Next, a method used by the calculating part 219 to calculate the maximum value, the minimum value, and an average value will be described with reference to FIGS. 19 and 20.

Figure 19:
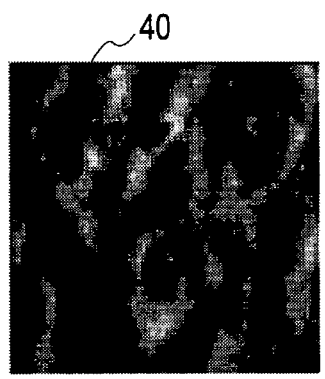
FIG. 19 shows a picture of the surface of each recording material.
Figure 19:
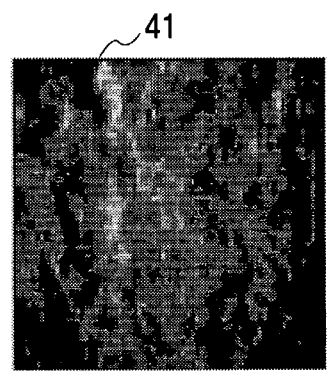
Figure 19:
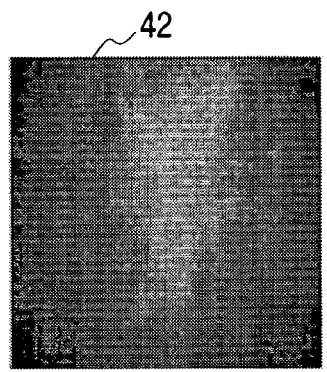
Figure 19:
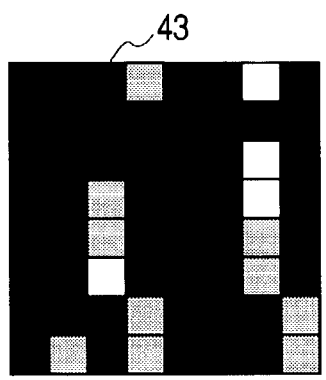
Figure 19:
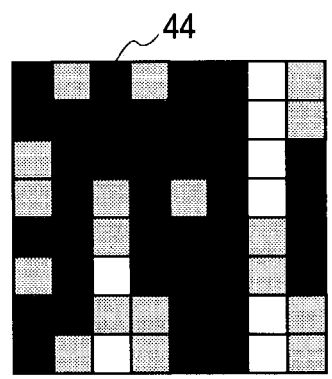
Figure 19:
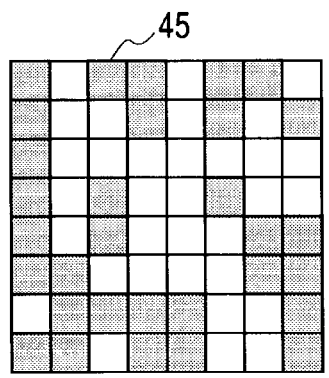
Figure 20:
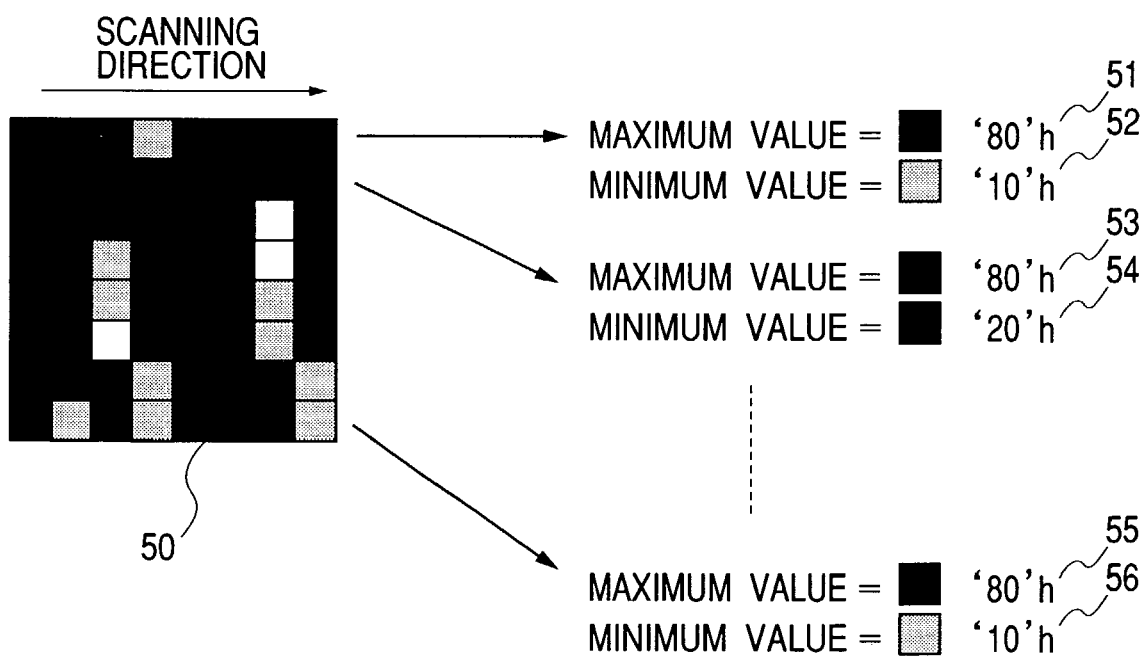
FIG. 20 is an explanatory diagram in which projection and depression depths are obtained.

FIG. 19 shows images obtained by performing digital processing on the surface images of various recording materials read by the 8×8 pixel CMOS area sensor.

The digital processing is performed by converting an analog output, which is output from the sensor part of the CMOS area sensor into 8-bit pixel data through A/D conversion.

Reference numeral 40 denotes the surface enlarged image of a recording material A that is so-called rough paper and has a relatively rough surface due to paper grains. Also, reference numeral 41 represents the surface enlarged image of a recording material B that is so-called plain paper, which is generally used. Further, reference numeral 43 indicates the surface enlarged image of a recording material C that is so-called gloss paper and is produced by sufficiently compressing paper grains.

Reference numerals 43 to 45 denote images obtained by reading these images 40 to 42 with the CMOS area sensor and performing digital processing on the read images. As described above, different surface images are obtained for different types of recording materials. This is mainly because surfaces of different paper have different states of paper grains. That is, when light is irradiated in a slanting direction onto a paper surface under a condition where paper grains stand, shadows are generated due to the grains. On the other hand, when the light irradiation is performed under a condition where paper grains lie down, no shadow is generated. For this reason, there are created the pictures numbered 43 to 45.

Next, a method of detecting projection and depression amounts of the surface of a recording material will be described with reference to FIG. 20. In FIG. 20, reference numeral 50 denotes an image obtained by subjecting a picture of the surface of a recording medium to digital processing. An analog output that is output from the sensor part of the CMOS area sensor is converted into 8-bit pixel data through A/D conversion, with the 8-bit data being determined in proportion to the brightness of the image. In this figure, reference numeral 51 denotes a portion that is the darkest on the first line of the 8×8 pixel image and has a value of '80'h in the illustrated example, while reference numeral 52 represents a portion that is the brightest on the first line of the 8×8 pixel image and has a value of '10'h in the illustrated example.

Figure 22:
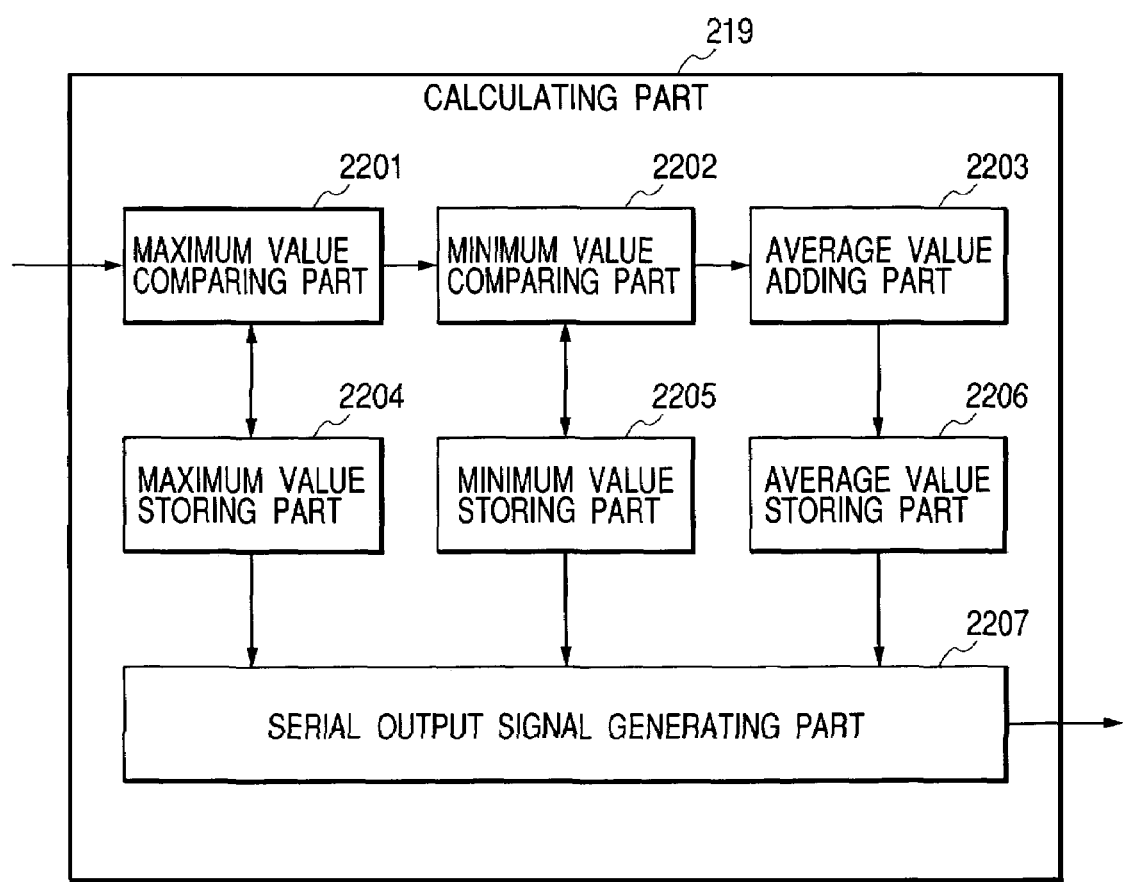
FIG. 22 is a block diagram of a calculating part 219.

The values obtained as a result of the A/D conversion are sent to the calculating part in order in a scanning direction. FIG. 22 is a block diagram of the calculating part. This calculating part includes a maximum value storing part 2204 storing the maximum value, a minimum value storing part 2205 storing the minimum value, and an average value storing unit 2206 storing an average value. The first data on each line is written into every area. Following this, the next data is sent to each of comparing parts 2201 and 2202. For instance, first, data is sent to the maximum value comparing part 2201 and is compared with data in the maximum value storage part 2204. When the sent data is greater than the maximum value, the data in the area storing the maximum value is overwritten. Following this, the data sent to the maximum value comparing part 2201 is sent to the minimum value comparing part 2202. In a like manner, when the sent data is smaller than the minimum value, the data in the area storing the minimum value is overwritten. Then, the data is sent to an average value adding part 2203 and is added to a value in an average value storing part 2206. In the case of the first line, for instance, "'80'h" shown with numeral 51 in FIG. 20, is written into the maximum value storing part 2201 and "'10'h" shown with numeral 52 in FIG. 20 is written into the minimum value storing part 2202. When processing for one line is finished, this means that a total value of output data for one line has been written into the average value storing part 2203, so that the value is divided by 8 and a result of this division is output to the outside of the sensor as an average value. At this time, the division by 8 may be performed for each pixel and a result of the division may be written into the average value storing part 2206.

Following this, the results of the calculation are converted into serial data by a serial output signal generating part 2207 and are transmitted to the outside of the chip. By calculating a difference between the transmitted maximum value and minimum value, it is possible for the control part outside of the chip to calculate the projection and depression sizes of the surface for discriminating the type of the recording material.

As described above, a mechanism for calculating the maximum value, the minimum value, and the average value is provided inside of the sensor chip, so that it becomes unnecessary to provide a large-scaled logic circuit outside of the CMOS area sensor. As a result, there is obtained a merit that even when a system does not include a logic circuit as a whole, it is possible to use the sensor. That is, by providing the logic circuit within the sensor and making them into one chip, it becomes possible to realize miniaturization and cost reduction. Also, when the mode in which only the calculation results are sent is selected, it becomes possible to increase a transfer rate.

The control part of the image forming apparatus discriminates the type/surface condition of a recording medium based on the projection and depression sizes of the surface and widths thereof and controls the image forming conditions. As a result, it becomes possible to perform favorable image forming irrespective of the type/surface condition of the recording medium.

As described above, according to the present invention, it becomes possible to realize speeding-up, miniaturization, and cost reduction of the control part of the image forming apparatus (not shown) that discriminates the type/surface condition of a recording medium.

Second Embodiment

A "picture reading device" that represents a second embodiment of the invention will be described with reference to FIGS. 6, 9, and 10. Note that the basic construction in this embodiment is the same as that in the first embodiment and the description in the first embodiment applies to portions having the same construction as those in the first embodiment. Therefore, a description will be given only of those portions whose constructions are different from those in the first embodiment.

Figure 6:
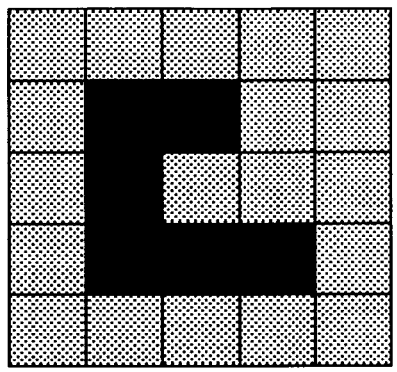
FIG. 6 is an explanatory diagram of the first embodiment.
Figure 7:
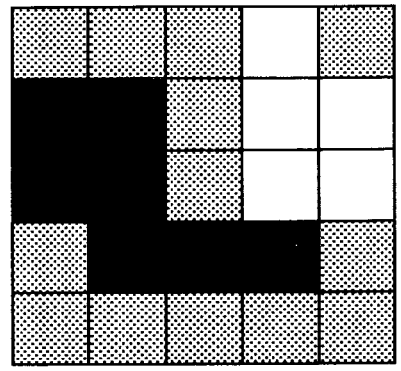
FIG. 7 is another explanatory diagram of the first embodiment.
Figure 8:
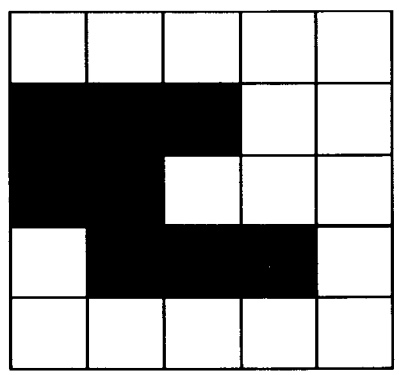
FIG. 8 is still another explanatory diagram of the first embodiment.
Figure 9:
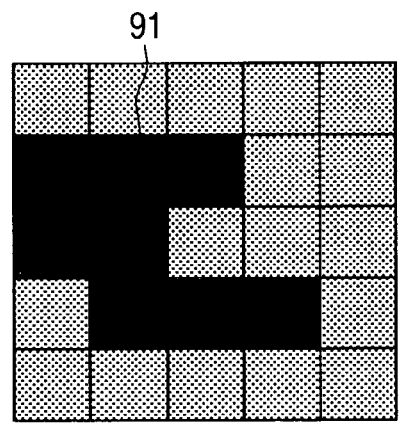
FIG. 9 is an explanatory diagram of a second embodiment of the invention.

If it is assumed that a state shown in FIG. 6 is a normal state, FIG. 9 shows a case where the quantity of light or accumulation time is insufficient, so that an image is dark as a whole. In such a case, the brightness of a portion 91, which is too dark, is below a predetermined lower limit value. When there exists a value that is below the lower limit value, the calculation circuit 219 sets an underflow bit. As a result of this operation, it becomes possible to detect a situation where an image is too dark and therefore it is impossible to obtain a correct amount of contrast.

Figure 10:
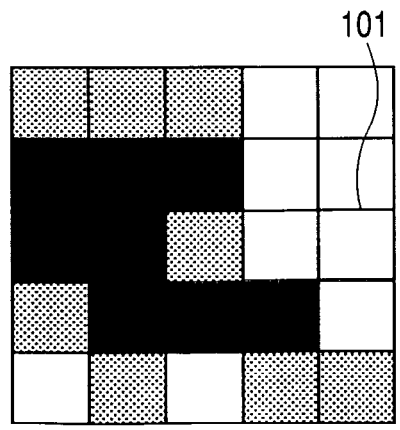
FIG. 10 is another explanatory diagram of the second embodiment.

Also, FIG. 10 shows a case where the quantity of light is conversely too large or the accumulation time is too long with reference to the normal state shown in FIG. 6, so that the image becomes too bright as a whole. In this case, the brightness of a portion 101, which is too bright, exceeds a predetermined upper limit value. When there exists a value that exceeds the upper limit value, the calculating part 219 sets an overflow bit. As a result of this operation, it becomes possible to detect a situation where an image is too bright and therefore it is impossible to obtain correct contrast.

Also, when there is performed rephotographing, the light quantity or accumulation time is increased if the underflow bit is set, and the light quantity or accumulation time is decreased when the overflow bit is set. As a result, it becomes possible to make judgment as to whether the light quantity should be decreased or increased at the time of the rephotographing.

FIG. 5 shows a transfer timing for one page (64 lines). After there is output data on ineffective pixel lines, data on 64 effective pixel lines 502 is output and, after outputting is performed for the 64th line, there is output an overflow bit or an underflow bit in an overflow/underflow bit area 503.

As described above, according to this embodiment, it becomes possible to immediately judge whether the light quantity at the time of photographing is correct or not and to determine whether the light quantity should be increased or decreased at the time of rephotographing with reference to a signal from the picture reading device. As a result, it becomes possible to simplify the construction of the control part of the image forming apparatus 8 (not shown).

Third Embodiment

A "picture reading device" that represents a third embodiment of the invention will be described with reference to FIGS. 11 and 12. Note that the basic construction in this embodiment is the same as that in the first embodiment and the description in the first embodiment applies to portions having the same construction as those in the first embodiment. Therefore, a description will be given only of those portions whose constructions are different from those in the first embodiment.

Figure 11:
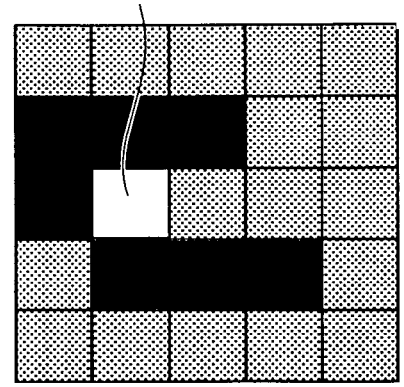
FIG. 11 is an explanatory diagram of a third embodiment of the invention.

FIG. 11 shows a case where an overflow occurs only in one pixel and the upper limit value is output due to a defective pixel 111. When a pixel in which an overflow occurs exists even after the light quantity is sufficiently reduced, it is possible to judge that there exists a defective pixel.

Figure 12:
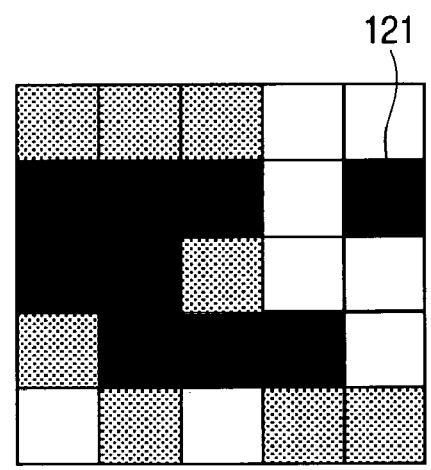
FIG. 12 is another explanatory diagram of the third embodiment.

Also, FIG. 12 shows a case where an underflow occurs only in one pixel and the lower limit value is output due to a defective pixel 121. When a pixel in which an underflow occurs exists even after the light quantity is sufficiently increased, it is judged that there exists a defective pixel.

The overflow bit or the underflow bit is calculated within the CMOS area sensor chip, so that it becomes possible to judge whether there exists a defective pixel by performing a small amount of calculation.

Fourth Embodiment

A "picture reading device" that represents a fourth embodiment of the invention will be described with reference to FIG. 4. Note that the basic construction in this embodiment is the same as that in the first embodiment and the description in the first embodiment applies to portions having the same construction as those in the first embodiment. Therefore, a description will be given only of those portions whose constructions are different from those in the first embodiment.

The calculating means in the first embodiment that calculates an edge number at the time of binarization using the maximum value and the minimum value of the sensor as threshold values or using a difference and average value thereof as the threshold values is provided within the CMOS area sensor chip. Also, data in the ineffective pixel portion 401 and data in the effective pixel portion 402 in FIG. 4 are not transmitted and only obtained calculation data is transmitted to the control part. Therefore, it becomes possible to substantially reduce the amount of communication with the control part.

As a result, it becomes possible to realize speeding-up, miniaturization, and cost reduction of the control part of the image forming apparatus (not shown).

Fifth Embodiment

A "picture reading device" that represents a fifth embodiment of the invention will be described with reference to FIGS. 13 and 14. Note that the basic construction in this embodiment is the same as that in the first embodiment and the description in the first embodiment applies to portions having the same construction as those in the first embodiment. Therefore, a description will be given only of those portions whose constructions are different from those in the first embodiment.

Figure 13:
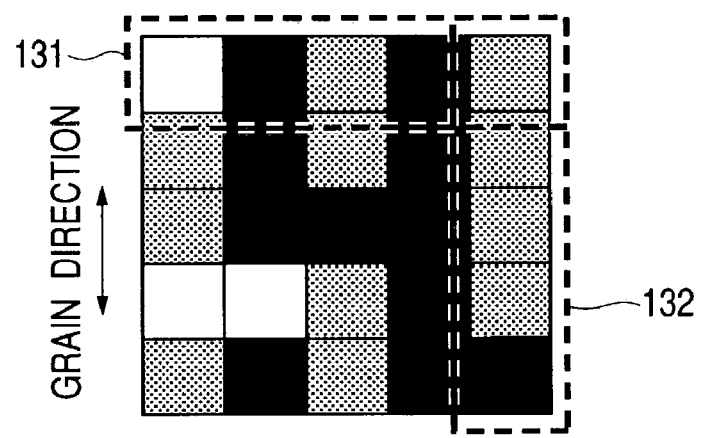
FIG. 13 is an explanatory diagram of a fifth embodiment of the invention.
Figure 14:
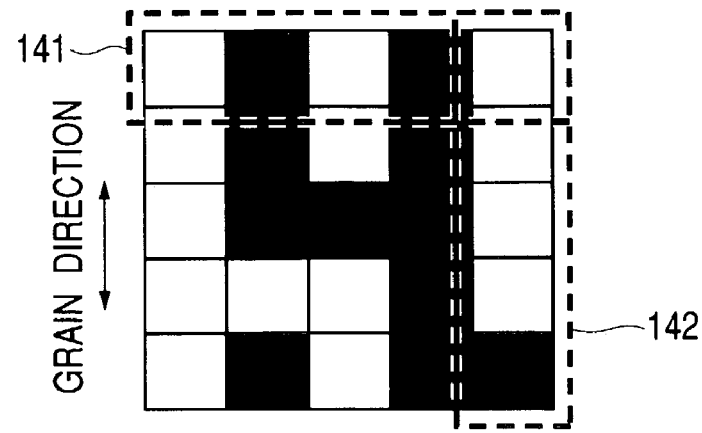
FIG. 14 is another explanatory diagram of the fifth embodiment.

FIG. 13 shows a surface image of paper whose grains possess a directional property. In FIG. 13, a calculation result obtained by calculating a difference between the maximum value and the minimum value in a predetermined area 131 that is long in a direction orthogonal to a grain direction becomes greater than a calculation result obtained by calculating a difference between the maximum value and the minimum value in another predetermined area 132 that is long in the same direction as the grain direction. Also, in FIG. 14, a binarized edge number obtained by performing calculation on data in the predetermined area 141 that is long in the direction orthogonal to the grain direction becomes greater than that obtained by performing calculation on data in the predetermined area 142 that is long in the same direction as the grain direction. By giving directional properties in the vertical direction and the horizontal direction to an area to be subjected to calculation and performing averaging, it becomes possible to average calculation results irrespective of whether measurement is performed by setting the grain direction as the vertical direction or the horizontal direction. As a result, there is realized a construction where there is exerted no influence of the directional property of paper grains.

That is, it is possible to suppress variations in detection result by providing the picture reading device with setting means for arbitrarily setting an area for which the maximum value, the minimum value, and an average value are to be calculated, and changing the area as necessary. As a result, even when there is performed measurement on paper having different paper grain directions, it becomes possible to measure the smoothness of the paper.

Sixth Embodiment

Figure 15:
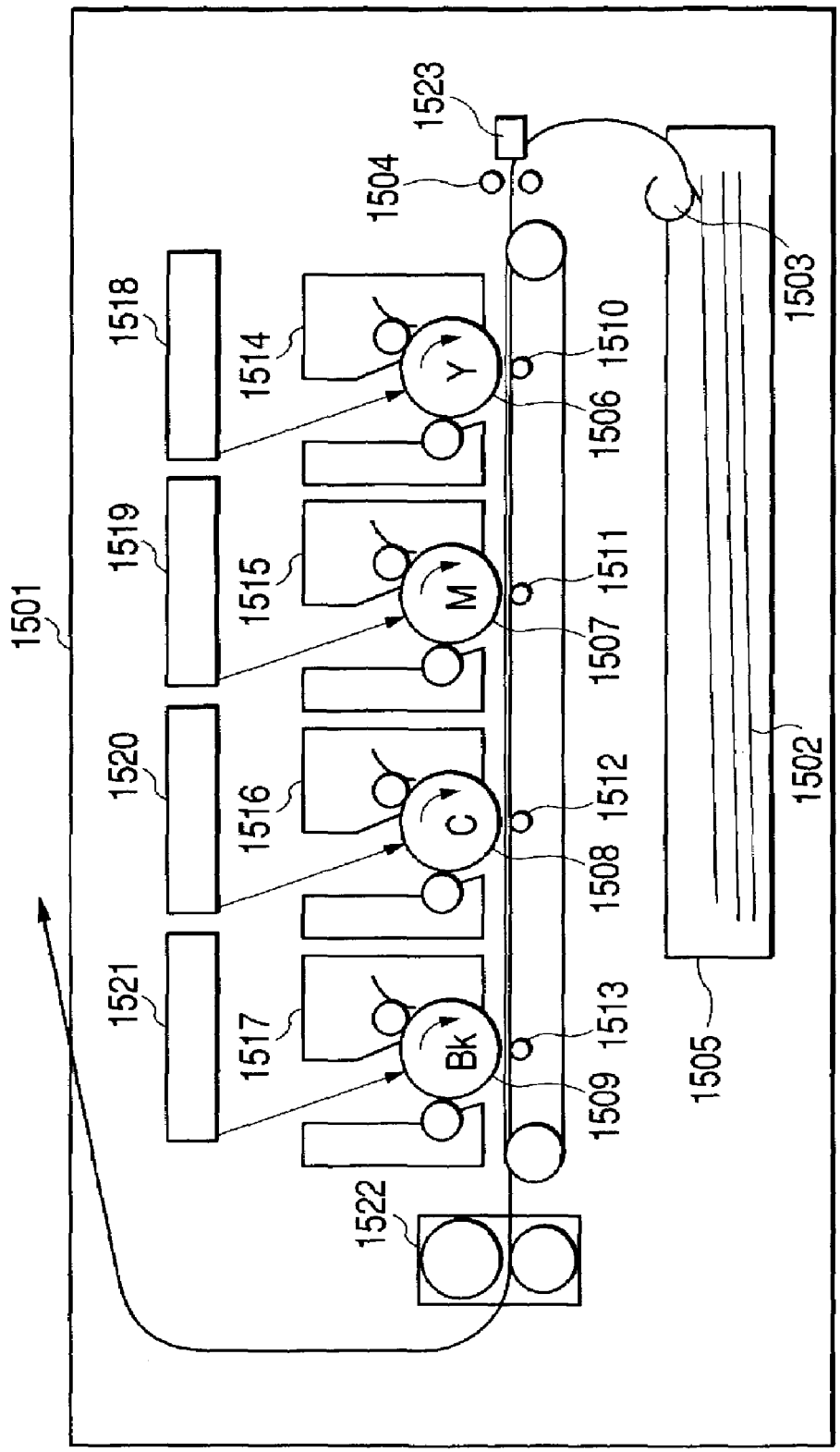
FIG. 15 is a cross-sectional view showing the schematic construction of a sixth embodiment of the invention.

FIG. 15 is a cross-sectional view showing the schematic construction of an "image forming apparatus" that represents a sixth embodiment of the invention. Note that the basic construction of the picture reading device is the same as that in the first embodiment, so that the description in the first embodiment applies to this embodiment and a description will be given only of those portions whose constructions are different from those in the first embodiment.

In FIG. 15, reference numeral 1501 denotes the image forming apparatus, numeral 1502 a sheet cassette, numeral 1503 a feed roller, numeral 1504 a transferring belt drive roller, numeral 1505 a transferring belt, numerals 1506 to 1509 photosensitive drums that respectively correspond to yellow, magenta, cyan, and black, numerals 1510 to 1513 transferring rollers that respectively correspond to yellow, magenta, cyan, and black, numerals 1514 to 1517 cartridges that respectively correspond to yellow, magenta, cyan, and black, numerals 1518 to 1521 optical units that respectively correspond to yellow, magenta, cyan, and black, and numeral 1522 a fixing unit.

This image forming apparatus transfers images in yellow, magenta, cyan, and black onto a recording sheet through an electrophotographic process while superimposing the images on each other, and heat-fixes the toner images using the fixing unit 1522 based on temperature control.

Also, the optical unit for each color is constructed so that a latent image is formed by exposing and scanning the surface of corresponding one of the photosensitive drums using a laser beam. Here, a series of these image forming operations are performed by controlling the scanning in a synchronization manner so that the images are transferred from a predetermined position on a transported recording paper.

Further, the image forming apparatus includes a sheet feeding motor that feeds and transports recording paper that is a recording material, a transferring belt drive motor that drives the transferring belt -drive roller, a photosensitive drum drive motor that drives the photosensitive drums and the transfer rollers for each color, and a fixing drive motor that drives a fixing roller.

Reference numeral 1523 denotes the picture reading device (also referred to as an "image reading sensor") that irradiates the surface of fed and transported recording paper with light, converges reflection light so as to form an image, and detects an image in a specific area of the recording material.

A control CPU (not shown) provided in the image forming apparatus gives a desired amount of heat to the recording paper using the fixing unit 1522, thereby melting and fixing the toner images on the recording paper.

Figure 16:
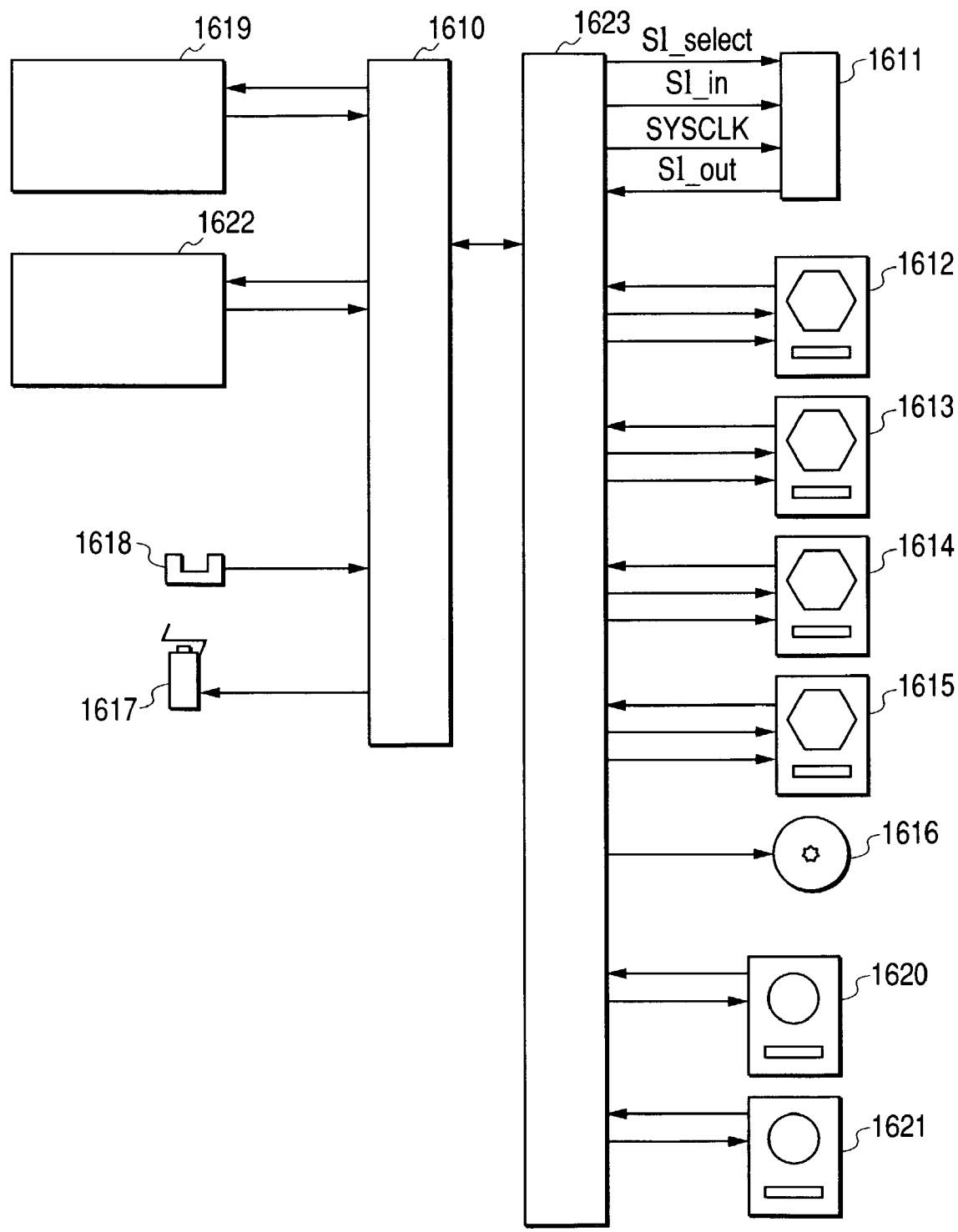
FIG. 16 shows each unit controlled by a CPU.
Figure 17:
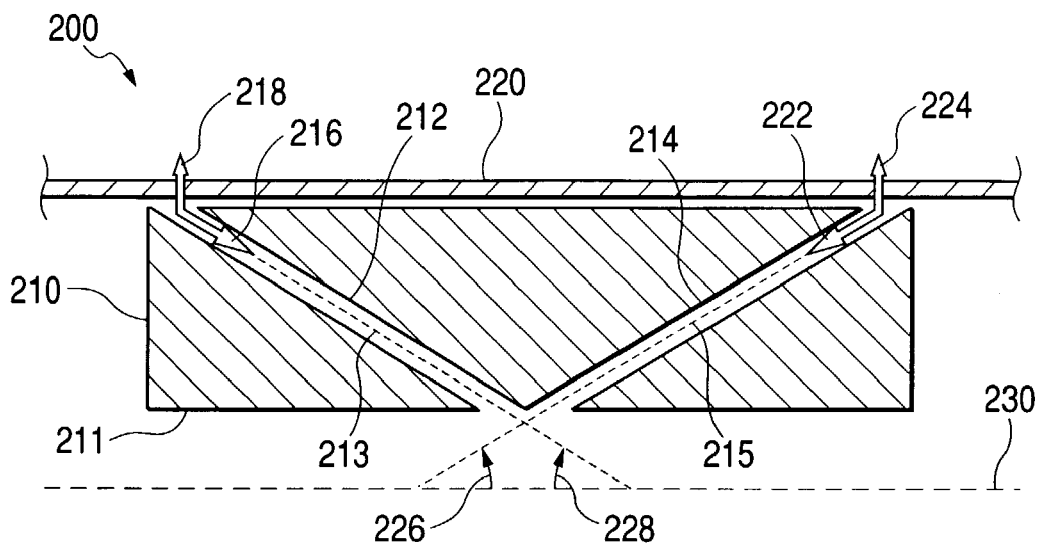
FIG. 17 is a cross-sectional view of a printer gloss meter disclosed in Japanese Patent Application Laid-Open No. 11-216938.
Figure 18:
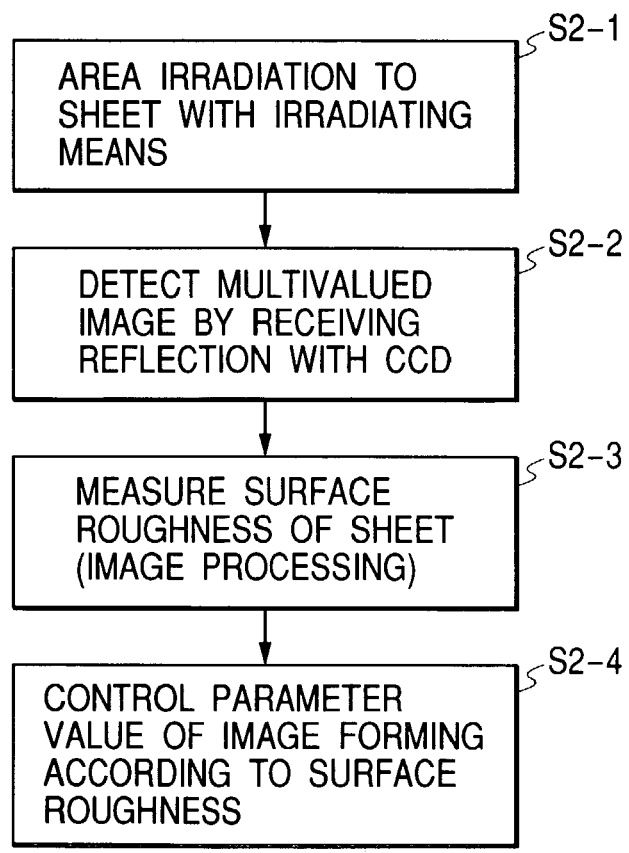
FIG. 18 is a flowchart showing a basic operation of a smoothness detector disclosed in Japanese Patent Application Laid-Open No. 11-271037.

Next, how the control CPU operates will be described with reference to FIG. 16. FIG. 16 shows the construction of each unit controlled by the control CPU.

In this drawing, reference numeral 1610 indicates the CPU, numeral 1611 the CMOS area sensor chip, numerals 1612 to 1615 each an optical unit that includes a polygon mirror, a motor, and a laser, scans a laser onto the surface of a corresponding photosensitive drum, and draws a desired latent image, numeral 1616 a sheet feeding motor for transporting a recording material, numeral 1617 a sheet feeding solenoid that is used in order to start driving of the feed roller for feeding the recording material, numeral 1618 a paper presence sensor that detects whether a recording material is set at a predetermined position, numeral 1619 a high-voltage power supply that controls a primary charging bias, a developing bias, a primary transferring bias, and a secondary transferring bias that are necessary for an electrophotographic process, numeral 1620 a drum drive motor that drives the photosensitive drums and the transferring rollers, numeral 1621 a belt drive motor that drives the transferring belt and a roller of the fixing unit, and numeral 1622 the fixing unit and a low-voltage power supply unit. With this construction, there is performed control in which a temperature is monitored by the control CPU 1610 using a thermistor (not shown) and a fixing temperature is maintained constant.

Reference numeral 1623 represents an ASIC that performs control of the speeds of motors in the CMOS area sensor 13 and the optical units 1612 to 1615 and control of the speed of the sheet feeding motor 1616 based on instructions from the control CPU 1610.

The motor speed control is performed by detecting a tack signal from a motor (not shown) and outputting an acceleration or deceleration signal to the motors so that the tack signal is output at predetermined intervals. As a result, by constructing the control circuit using a circuit realized by the hardware of the ASIC 1623, there is obtained a merit that it becomes possible to reduce the control load placed on the CPU 1610.

Upon receiving a print command by means of an instruction from a host computer (not shown), the control CPU 1610 judges the presence or absence of a recording material using the paper presence sensor 1618. When a result of this judgment is affirmative, the control CPU 1610 drives the sheet feeding motor 1616, the drum drive motor 1620, and the belt drive motor 1621. In addition, the control CPU 1610 drives the sheet feeding solenoid 1617, thereby transporting the recording material to a predetermined position.

When the recording material is transported to a position at which the CMOS area sensor chip 13 is provided, the control CPU 1610 issues to the ASIC 1623 an instruction to perform image pickup (taking a picture) using the CMOS area sensor chip 13, and the CMOS area sensor chip 13 picks-up a surface image of the recording material.

At this time, after setting the Sl_select signal as active, the ASIC 1623 outputs SYSCLK having a predetermined pulse at a predetermined timing, thereby obtaining data of the picked-up image output from the CMOS sensor portion 201 by means of the Sl_out signal.

On the other hand, as to setting of a gain for the CMOS area sensor chip 13, after setting the Sl_select signal as active by setting a value predetermined by the control CPU 1610 in a register in the ASIC 1623, the ASIC 1623 outputs SYSCLK of a predetermined pulse at a predetermined timing, thereby setting a gain for the CMOS area sensor chip 13 by means of the Sl_in signal.

The ASIC 1623 then receives the maximum value and the minimum value output from the CMOS area sensor chip 13 for each scanning line. Following this, in the example shown in FIG. 20, for instance, after reading of data on one line is finished, there is performed calculation of a difference between the maximum value and the minimum value ('80'h–'10'h='70'h) and stores the difference in an area in which each projection and depression amount calculation result value is accumulated. For instance, in FIG. 20, the difference between the maximum value and the minimum value of the contrast on the first line is '70'h. In a like manner, reference numeral 53 denotes a portion that is the darkest on the second line and has a value of '80'h, while reference numeral 54 represents a portion that is the brightest on the second line and has a value of '20'h. The difference therebetween becomes "'80'h–'20'h='60'h." Then, this value ('60'h) is added to data in the area in which there are accumulated the projection and depression amount calculation results. Reference numeral 55 denotes a portion that is the darkest on the eighth line and has a value of '80'h, while reference numeral 56 represents a portion that is the brightest on the eighth line and has a value of '10'h. The difference between these values becomes "'80'h–'10'h='70'h." The value obtained by calculating the difference between the maximum value and the minimum value on each line and summing up the differences on respective lines is defined as a projection and depression amount calculation result value of the surface of the recording material.

Figure 21:
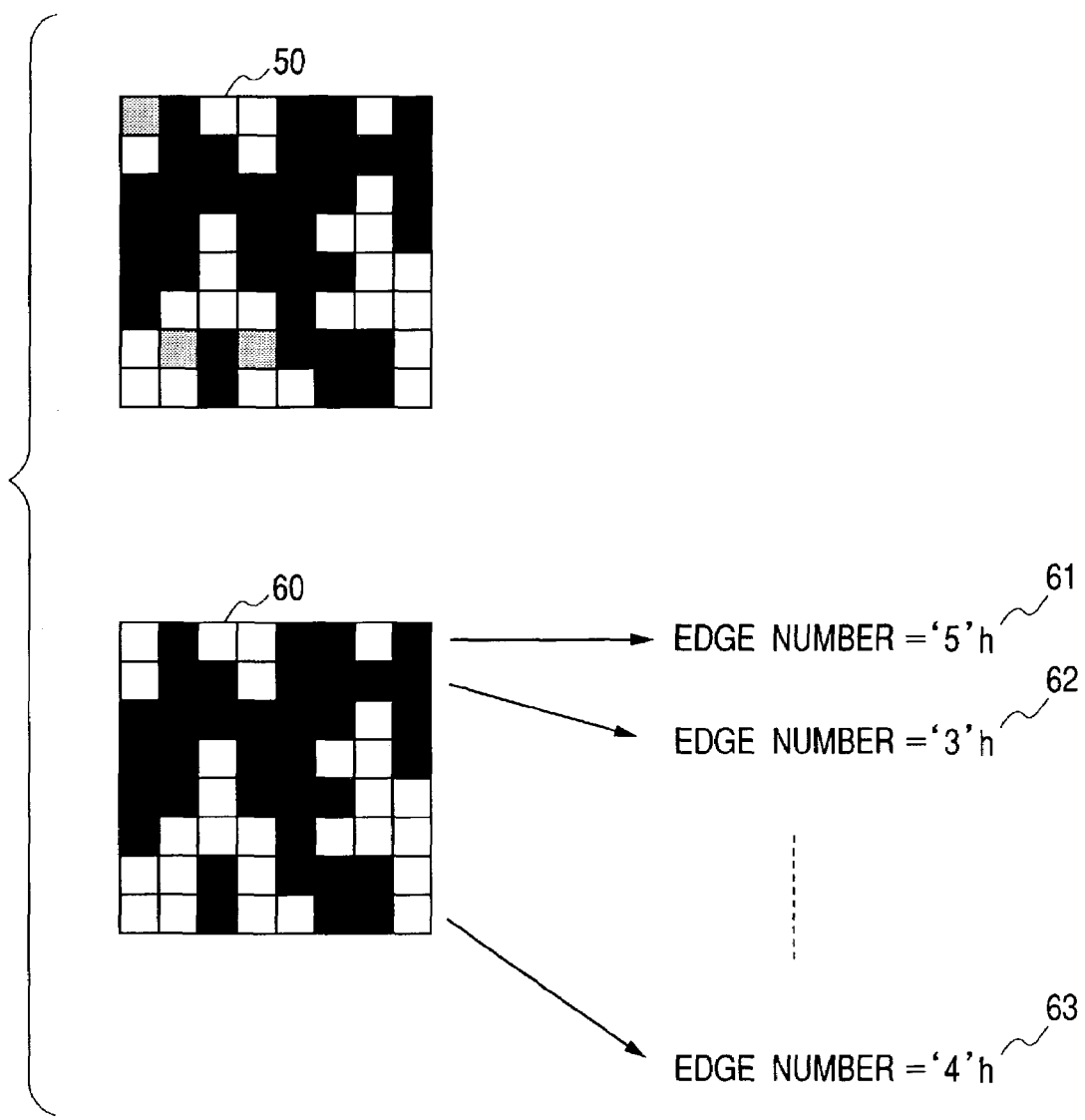
FIG. 21 is an explanatory diagram in which projection and depression widths are obtained.

Next, a method used by the ASIC 1632 to detect the projection and depression edge amounts of a recording material surface will be described with reference to FIG. 21.

Reference numeral 50 denotes an image obtained by subjecting the surface of a recording material to digital processing. Also, reference numeral 60 indicates a result obtained by binarizing an 8×8 pixel image picked up at a sampling timing of the CMOS area sensor using a threshold value that is the total value of average values output for respective lines at an immediate preceding sampling timing. Here, it is possible to obtain a similar image even by reading an average value of each immediate preceding line and setting the value as a threshold value. Reference numeral 61 denotes an edge number on the first line obtained as a result of the binarization, with the edge number being '05'h in this example. On the other hand, reference numeral 62 indicates an edge number on the second line that is '03'h in this example.

In a like manner, reference numeral 63 denotes an edge number on the eighth line that is '03'h in this example.

A value obtained by counting the edge number on each line and summing up the edge numbers on all lines is defined as a projection and depression edge amount calculation result value of the recording material surface that serves as second calculating means.

In the manner described above, the ASIC 1623 writes into an internal register two values that are the projection and depression amount calculation results of the recording material surface as first calculating means and the projection and depression edge numbers of the recording material surface as second calculating means.

The CPU 1610 reads data in the register in the ASIC 1623, discriminates the type of a fed recording material, and variably controls conditions concerning the developing bias applied by the high-voltage power supply 1619 in accordance with a result of the discrimination.

When there is used a recording material whose surface grains are coarse, that is, when so-called rough paper is used, for instance, there is performed control in which the developing bias is reduced in comparison with a case of plain paper, thereby suppressing the amount of toner adhering to the surface of the recording material and preventing scattering of the toner. This control is performed in order to solve a problem that the amount of toner adhering to the surface of the recording material becomes large particularly in the case of rough paper and therefore the toner is scattered due to the paper grains and image quality is degraded.

Also, the CPU 1610 discriminates the type of the fed recording material and variably controls conditions concerning the temperature of the fixing unit 1622 in accordance with a result of the discrimination. This control is particularly effective in solving a problem that in the case of an OHT, if the fixing property of toner adhering to the surface of the recording material is inferior, there is degraded the transparency of the OHT.

Further, the CPU 1610 discriminates the type of the fed recording material and variably controls the transport speed of the recording material in accordance with a result of the discrimination. This variable control of the transport speed is realized by the setting by the CPU 1610 of a speed control register value of the ASIC 1623 that conducts speed control. As a result of this control, in particular in the case of an OHT, gloss paper, or the like, it becomes possible to enhance the fixing property of the toner adhering to the surface of the recording material, thereby enhancing glossiness and improving image quality.

As described above, in this embodiment, a hardware circuit realized by the ASIC performs the first calculation and the second calculation described above (see the description in the first embodiment) using a surface image of a recording material picked-up by the CMOS area sensor. Then, the CPU variably controls developing conditions, temperature control conditions for the fixing unit, a transport speed of the recording material, and the like in accordance with the results of the calculation, which makes it possible to improve image quality.

According to the embodiments described above, it becomes possible to provide a picture reading device that is suited for discriminating the type/surface condition of a recording medium while requiring only a small circuit scale and less memory, and an image forming apparatus that uses this picture reading device.

The present invention has been described above with reference to several preferred embodiments. However, it is apparent that the present invention is not limited to those embodiments and various changes and applications are possible without departing from the scope of the appended claims.

What is claimed is:

1. A picture reading device for discriminating a type of a recording medium, comprising:
   an irradiating element that irradiates a surface of the recording medium; and
   a picture reading part for receiving reflection light from the recording medium,
   wherein said picture reading part is constructed as a monolithic semiconductor chip and includes:
   a reading element for reading a picture of a surface of a reading target and photoelectrically converting the picture;
   an A/D conversion circuit for convening information of the picture read by said reading element into a digital value;
   a calculation circuit for calculating a parameter concerning a smoothness characteristic for discriminating the type of the recording medium based on two-dimensional picture information having a plurality of digital values converted by the A/D conversion unit; and
   an output part for outputting a result of the calculation by said calculation circuit,
   wherein said reading element, said A/D conversion circuit, said calculation circuit and said output part are mounted in one chip,
   wherein said calculation circuit calculates a maximum value, a minimum value and an average value of digital values per a line in a predetermined direction of the two-dimensional picture information, and said output part outputs the maximum value, the minimum value and the average value per line in the predetermined direction of the two-dimensional picture information.

2. A picture reading device according to claim 1, further comprising:
   a lens that is provided between the recording medium and said picture reading part and condenses the reflection light from the recording medium.

3. A picture reading device according to claim 1,
   wherein an effective pixel area of the two-dimensional picture information is variable.

4. A picture reading device according to claim 1,
   wherein when a value output from said A/D conversion circuit exceeds a predetermined value, an overflow bit is output, and when the output value is below a predetermined value, an underflow bit is output.

5. An image forming apparatus comprising:
   an image forming part for forming an image on a recording medium;
   a picture reading part for reading a picture of a surface of the recording medium;
   a discriminating part for discriminating a type of the recording medium based on a result of the reading by said picture reading part; and
   a setting part for setting image forming conditions for the image forming part based on a result of the discrimination by said discriminating part,
   wherein said picture reading part is constructed as a monolithic semiconductor chip and includes:
   a reading element for reading a picture of a surface of a reading target and photoelectrically converting the picture;
   an A/D conversion circuit for converting information of the picture read by said reading element into a digital value;
   a calculation circuit that calculates a parameter concerning a smoothness characteristic for discriminating the type of the recording medium based on two-dimensional picture information having a plurality of digital values converted by said A/D conversion circuit; and
   an output unit for outputting a result of the calculation by said calculation circuit,
   wherein said reading element, said A/D conversion circuit, said calculation circuit and said output part are mounted in one chip,
   wherein said calculation circuit calculates a maximum value, a minimum value and an average value of digital values per a line in a predetermined direction of the two-dimensional picture information, and said output part outputs the maximum value, the minimum value and the average value per the line in the predetermined direction of the two-dimensional picture information.

6. An image forming apparatus according to claim 5, further comprising:
   a lens that is provided between the recording medium and said picture reading part and condenses the reflection light from the recording medium.

7. An image forming apparatus according to claim 5,
   wherein an effective pixel area of the picture information is variable.

8. An image forming apparatus according to claim 5,
   wherein when a value output from said A/D conversion circuit exceeds a predetermined value, an overflow bit is output, and when the output value is below a predetermined value, an underflow bit is output.

9. An image forming apparatus according to claim 5, further comprising:
   a defect judging unit for judging whether a defective pixel exists based on one of the overflow bit and the underflow bit.

* * * * *

UNITED STATES PATENT AND TRADEMARK OFFICE
CERTIFICATE OF CORRECTION

PATENT NO. : 7,339,702 B2
APPLICATION NO. : 10/420711
DATED : March 4, 2008
INVENTOR(S) : Akita et al.

It is certified that error appears in the above-identified patent and that said Letters Patent is hereby corrected as shown below:

ON TITLE PAGE [56] REFERENCES CITED:

Foreign Patent Documents, "11216938" should read --11-216938--.

ON TITLE PAGE [56] REFERENCES CITED:

Other Publications, "JP   11271037" should read --JP   11-271037--.

COLUMN 4:

Line 22, "Lens" should read --lens--.

COLUMN 10:

Line 4, "belt   -drive" should read --belt drive--.

COLUMN 13:

Line 13, "convening" should read --converting--.

Signed and Sealed this

Sixth Day of January, 2009

JON W. DUDAS
*Director of the United States Patent and Trademark Office*